May 3, 1955 W. KASTEN ET AL 2,707,563
FILTER
Filed May 29, 1948 2 Sheets-Sheet 1

INVENTOR.
WALTER KASTEN
BY GUY C. FRICKE

ATTORNEY

May 3, 1955   W. KASTEN ET AL   2,707,563
FILTER
Filed May 29, 1948   2 Sheets-Sheet 2
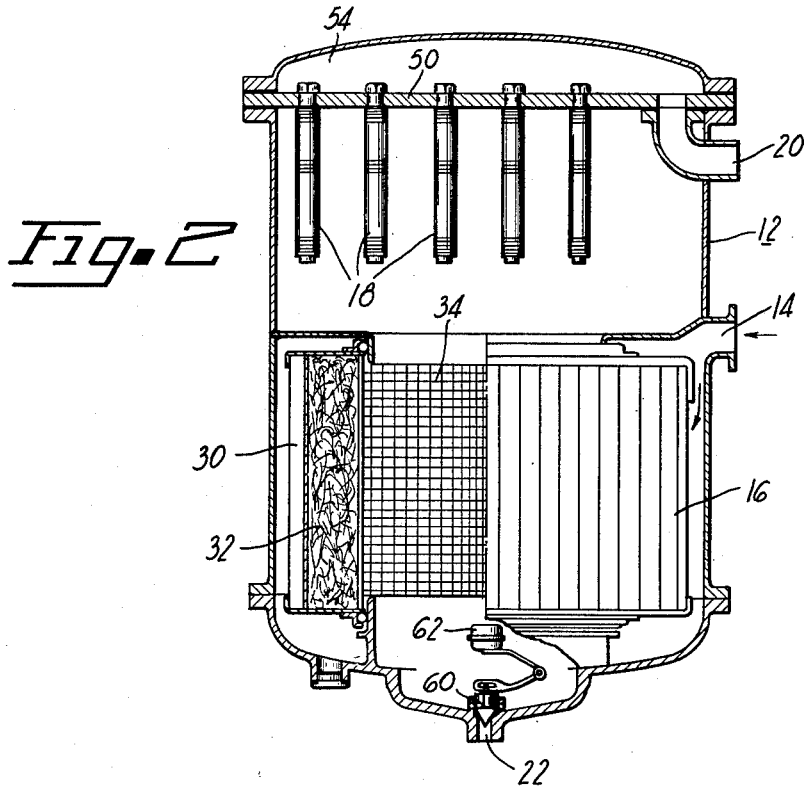
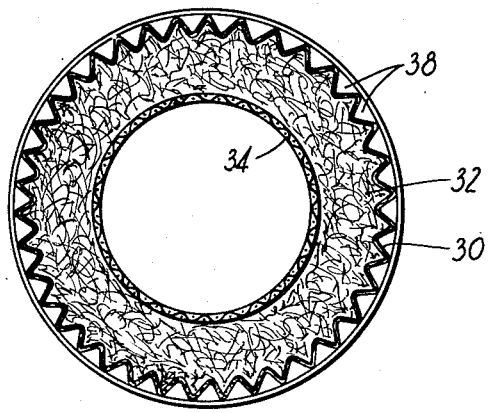
INVENTOR.
WALTER KASTEN
BY GUY C. FRICKE
M. A. Hobbs
ATTORNEY

United States Patent Office 2,707,563
Patented May 3, 1955

2,707,563

FILTER

Walter Kasten and Guy C. Fricke, Detroit, Mich., assignors to Bendix Aviation Corporation, South Bend, Ind., a corporation of Delaware Application May 29, 1948, Serial No. 29,978

2 Claims. (Cl. 210—184)

The present invention relates to a fluid conditioning apparatus and more particularly to an apparatus for demulsifying and filtering fluids.

One of the principal objects of the present invention is to provide an efficient compact fluid demulsifying and filtering apparatus which is economical to build and operate and easy to service and maintain in constant operation over extended periods of time.

Another object is to provide an apparatus for removing water and other foreign matter from gasoline, kerosene or the like wherein the several elements are capable of effectively performing their respective operations over long periods of time unhampered by the water or foreign matter removed.

Still another object of the invention is to provide an efficient and economical method of removing water and other foreign matter from a fluid such as gasoline or kerosene.

Further objects and advantages of the present invention will appear from the following description and accompanying drawings, wherein:

Figure 2 is a vertical section through another embodiment of our apparatus; and

Figure 3 is a horizontal section of the demulsifying and filtering unit shown in Figures 1 and 2, taken on line 3—3 of Figure 1.

Figure 1:
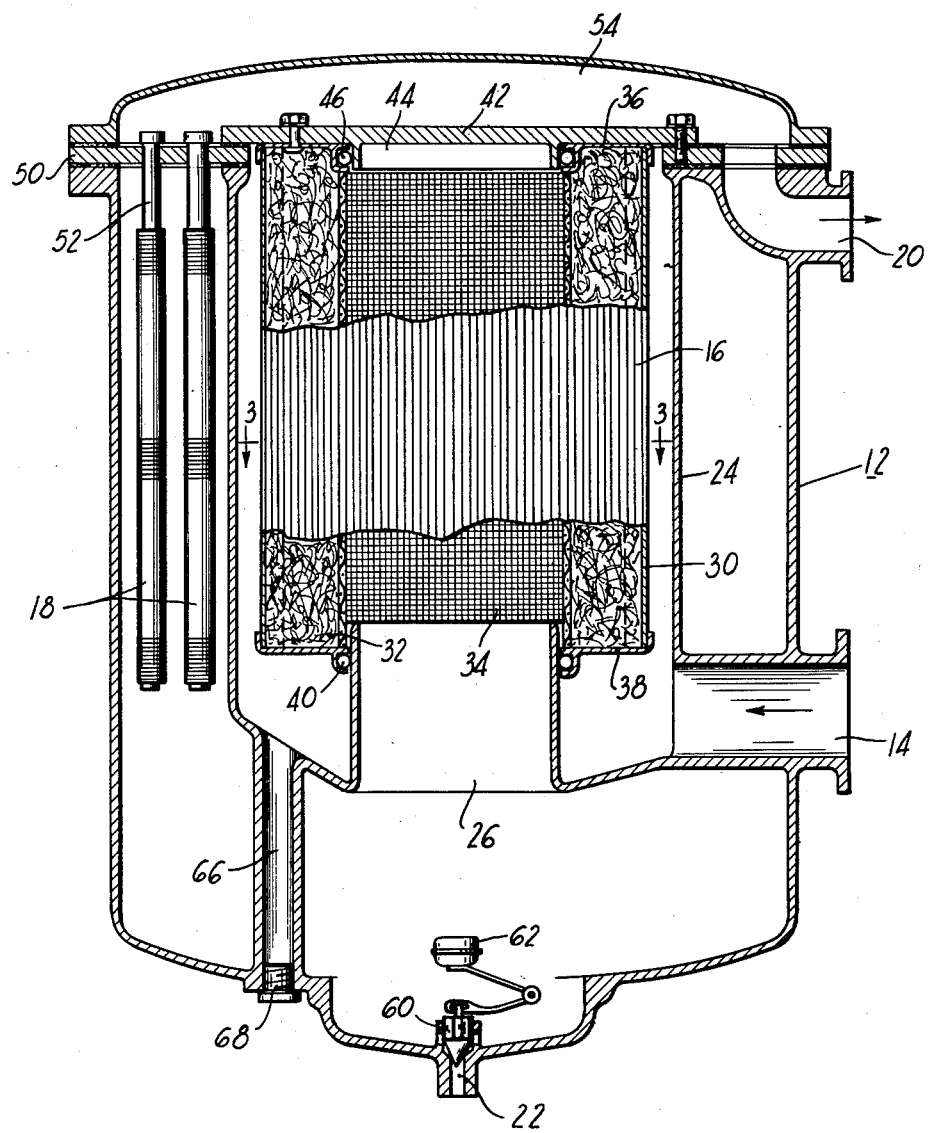
Figure 1 is a vertical section through one embodiment of our demulsifying and filtering apparatus.

The invention broadly comprises conditioning fluid, such as gasoline or kerosene, containing water and/or particles of solid foreign matter, by first removing the bulk or a substantial portion of the solid matter, then causing the minute droplets of water to coalesce to form relatively large droplets, and removing said large droplets and substantially all the remaining particles of the solid matter. Referring specifically to the drawings, in which two modifications of our apparatus for carrying out the foregoing operation are shown and in which like reference numerals designate like parts throughout several views, numeral 12 designates a cylindrical tank, 14 an inlet for contaminated fluid such as gasoline containing water, 16 a fluid filtering and demulsifying unit, 18 a plurality of fluid filtering elements, 20 an outlet for purified fluid, and 22 an outlet for water and other fluid contaminants.

Tank 12 contains a centrally located cylindrical chamber 24 for housing the filtering and demulsifying unit 16 which is mounted over a fluid passage 26 connecting chamber 24 with the lower portion of tank 12. Unit 16 consists of a rather porous paper filter 30 impregnated with some material such as a resin to make it resistant to water, gasoline, kerosene and the like, pleated and formed into a cylindrically shaped member, and of a fine fibrous mass of material 32, such as fiber glass, contained in an annular space between the inside wall of the pleated paper element 30 and a perforated metal or wire screen cylinder 34. The two ends of the unit 16 are sealed by impervious rings 36 and 38 cemented to the ends of the pleated paper and to cylinder 34 so that the fibrous material is completely enclosed in the unit. By this arrangement, the fluid, in passing through the filter element, is uniformly distributed over the outside surface of the fibrous mass so that channeling of the fluid through the fibrous material is minimized or completely prevented. The pleated filter element around the fibrous material also prevents this material from becoming impregnated with foreign matter which would impair the efficiency of the unit as a demulsifier. While, as shown in the drawings, the filter 30 is of the pleated paper type, any other suitable type of filter element, such as an edge type element, may be substituted therefor.

Unit 16 is mounted over the upper end of passage 26 and is held in a fluid-tight relationship therewith by a sealing ring 40. The upper end of unit 16 is sealed by a cover 42 having an annular projection 44 extending into the internal portion of the filter element, said element and annular projection being sealed in a fluid-tight relationship by a sealing ring 46 which slips over the outside of said projection.

The fluid entering tank 12 first passes through the side walls of filtering element 30, thence through the fibrous mass 32, and downwardly through passage 26 into the lower portion of tank 12. On entering the lower portion of the tank, the fluid passes upwardly around the outside walls of chamber 24 into the annular space occupied by the filtering elements 18, which as shown in the drawings, are of the edge type suspended from a partition 50 disposed near the upper end of the tank. The edge type filtering elements have a hollow interior closed at the lower end and connected at the upper end through a supporting stem 52 to an outlet chamber 54, which in turn is connected with fluid outlet 20. In this embodiment, the partition, in addition to supporting the filtering units 18, also supports cover 42 which may be removed along with the top of the tank in order to service the filtering and demulsifying unit 16.

The water removed from the fluid settles to the bottom of the tank and is drained off through outlet 22 which is controlled by a valve 60 and float mechanism 62, said float being of such size and weight that it will float on the water but not on the kerosene, gasoline or the like. Thus, when the water reaches a predetermined level in the lower end of tank 12, the float mechanism opens valve 60 and permits the water to escape through outlet 22. Any free water which may be removed before it passes through filtering and demulsifying unit 16 collects in the lower end of chamber 24 and is drawn off through a passage 66 normally closed by a threaded plug 68 or a suitable valve in the lower end thereof.

In the operation of the embodiment shown in Figure 1, contaminated fluid, such as gasoline containing water and particles of foreign matter, enters the apparatus through fluid inlet 14, passes upwardly in chamber 24 around the outside of the filtering and demulsifying unit 16 and thence through the filtering element 30 where a substantial portion of the solid foreign matter is removed. Any large droplets of free water which may be present in the fluid at the time it enters the apparatus, settle to the bottom of chamber 24 and are drawn off through conduit 66. After passing through the filtering element 30, the fluid flows through the fibrous material 32 wherein the minute droplets of water in the emulsion coalesce to form relatively large droplets which pass through the wire screen 34 and downwardly with the fluid through passage 26 into the lower portion of tank 12. As the fluid leaves passage 26, the droplets of water settle to the bottom of the tank around outlet valve 22. Small droplets of water may be carried with the fluid to the filtering elements 18 where they collect on the surface thereof, coalesce and drop to the bottom of the tank. The fluid passes through the filtering elements 18 into outlet chamber 54 above partition 52 and, in a purified state, leaves the apparatus through fluid outlet 20. As the filtering operation proceeds, the water continues to rise in the lower portion of tank 12 until the float mechanism, rising with the water, opens valve 60 and permits the water to escape through outlet 22. The foregoing operation will continue to extended periods of time without attention.

Another embodiment of our invention is shown in Figure 2, in which tank 12 is divided by a horizontal partition near the central portion thereof into upper and lower chambers, the edge type filter elements being disposed in the upper chamber and the demulsifying and filtering unit in the lower chamber. The contaminated fluid enters the lower chamber and passes through the filtering element 30, the fibrous material 32, into the internal portion of the unit and thence upwardly into the upper portion of the tank. A plurality of edge type filters are suspended from a partition similar to that shown in Figure 1 at numeral 50. As the fluid passes upwardly from the filtering and demulsifying unit to the filtering elements 18, the relatively large droplets of water settle to the bottom of the tank around outlet valve 22. The smaller droplets coalesce on the surface of filters 18 and then settle to the bottom of the tank. The purified fluid passes through filters 18 and from the apparatus through outlet 20.

Although only two embodiments of our apparatus have been shown and described herein, it is understood that many modifications may be made to suit requirements. Under certain operating conditions, it may be desirable to separate filtering element 30 from the fibrous material 32 so that the apparatus would consist of three independent units, that is, a filtering unit to remove a substantial portion of the foreign solid material, a unit for demulsifying the liquid and a filtering unit to remove the fluid contaminants and substantially all the remainder of the solid material. Further modifications in the present apparatus will occur to those skilled in the art.

We claim:

1. An apparatus for removing contaminants from a liquid, comprising an outer casing, an inner casing spaced from the side walls and bottom of said outer casing and connected with said outer casing through an opening in the lower end thereof, a liquid inlet passage communicating with said inner casing, a liquid outlet passage communicating with said outer casing near the top thereof, a unit in said inner casing interposed between said inlet passage and the opening in the bottom of said casing for coalescing droplets of liquid contaminants, a unit in the space between the side walls of the two casings for repelling said coalesced droplets while permitting the liquid being purified to pass therethrough, and a sump in the lower end of said outer casing for collecting the contaminating liquid as a separate layer.

2. An apparatus for removing liquid contaminants from a liquid, comprising an outer casing, an inner casing spaced from the side walls and bottom of the outer casing and connected with said outer casing through an opening in the lower end thereof, a liquid inlet passage communicating with said inner casing, a liquid outlet passage communicating with said outer casing, a unit including a filter member and a fibrous member in said inner casing interposed between said inlet passage and the opening in the bottom of said casing, a filter element disposed in the space between the side walls of the two casings functionally interposed between the opening from the inner casing and said outlet passage for repelling the coalesced droplets of contaminating liquid, and a sump in the lower end of said outer casing for collecting said contaminating liquid.

References Cited in the file of this patent

UNITED STATES PATENTS

| Number | Name | Date |
|---|---|---|
| 1,193,970 | Bacher | Aug. 8, 1916 |
| 1,663,322 | Tekavec | Mar. 20, 1928 |
| 1,787,577 | Hills | Jan. 6, 1931 |
| 1,804,743 | Cannon | May 12, 1931 |
| 1,947,709 | Garrison et al. | Feb. 20, 1934 |
| 2,139,675 | Fleisher | Dec. 13, 1938 |
| 2,347,384 | Winslow et al. | Apr. 25, 1944 |
| 2,362,530 | Bennett | Nov. 14, 1944 |
| 2,412,841 | Spangler | Dec. 17, 1946 |
| 2,523,793 | Vance | Sept. 26, 1950 |

FOREIGN PATENTS

| Number | Country | Date |
|---|---|---|
| 10,940 | Great Britain | A. D. 1915 |